(12) United States Patent
Shimada et al.

(10) Patent No.: US 8,786,582 B2
(45) Date of Patent: Jul. 22, 2014

(54) DISPLAY PANEL AND DISPLAY APPARATUS

(75) Inventors: Junya Shimada, Osaka (JP); Shinya Tanaka, Osaka (JP); Tetsuo Kikuchi, Osaka (JP); Chikao Yamasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 198 days.

(21) Appl. No.: 13/504,133

(22) PCT Filed: Jun. 2, 2010

(86) PCT No.: PCT/JP2010/059382
§ 371 (c)(1),
(2), (4) Date: Apr. 26, 2012

(87) PCT Pub. No.: WO2011/052258
PCT Pub. Date: May 5, 2011

(65) Prior Publication Data
US 2012/0218237 A1  Aug. 30, 2012

(30) Foreign Application Priority Data

Oct. 27, 2009  (JP) .................................. 2009-246960

(51) Int. Cl.
*G09G 5/00*     (2006.01)
*G02F 1/1345*   (2006.01)

(52) U.S. Cl.
CPC ........ *G02F 1/13452* (2013.01); *G02F 1/13454* (2013.01)
USPC .......................................... 345/204; 349/155

(58) Field of Classification Search
CPC . G09G 3/3611; G09G 3/3674; G09G 3/3677; G09G 3/3685; G09G 2300/0408; G09G 2300/0426; G09G 2300/043; G02F 1/13452; G02F 1/13454

USPC ............ 345/87, 204, 205, 206; 349/149, 155, 349/156, 157
See application file for complete search history.

(56) References Cited

U.S. PATENT DOCUMENTS

| 4,826,297 A | * | 5/1989 | Kubo et al. | .................... 349/151 |
| 5,179,460 A | * | 1/1993 | Hinata et al. | .................. 349/149 |

(Continued)

FOREIGN PATENT DOCUMENTS

| JP | 06-505605 A | 6/1994 |
| JP | 08-087897 A | 4/1996 |

(Continued)

OTHER PUBLICATIONS

Official Communication issued in International Patent Application No. PCT/JP2010/059382, mailed on Jun. 29, 2010.

(Continued)

*Primary Examiner* — Tom Sheng
(74) *Attorney, Agent, or Firm* — Keating & Bennett, LLP

(57) ABSTRACT

The present invention is to provide a display panel and a display apparatus which can reduce the picture-frame area while sufficiently preventing the delay of signals by allowing a required amount of current to flow. The display panel of the present invention is a display panel which includes a circuit substrate, and an opposed substrate facing the circuit substrate, and which is featured in that the circuit section is arranged in the picture-frame area of the display panel, in that the circuit section includes trunk wiring, and branch wiring connected to the gate electrode or the source electrode of a transistor in the circuit section, and in that all or a part of the trunk wiring is provided on the opposed substrate, and the branch wiring is provided on the circuit substrate so as to be electrically connected to the trunk wiring via a conductor.

7 Claims, 10 Drawing Sheets

(56) References Cited

U.S. PATENT DOCUMENTS

| | | | |
|---|---|---|---|
| 5,222,082 A | | 6/1993 | Plus |
| 5,434,899 A | | 7/1995 | Huq et al. |
| 5,689,352 A | * | 11/1997 | Kishigami .................... 349/149 |
| 5,774,100 A | * | 6/1998 | Aoki et al. ...................... 345/87 |
| 6,292,248 B1 | * | 9/2001 | Lee et al. ...................... 349/149 |
| 6,392,735 B1 | | 5/2002 | Tani |
| 6,411,359 B1 | * | 6/2002 | Kobayashi et al. ............ 349/149 |
| 6,600,543 B1 | * | 7/2003 | Lee et al. ...................... 349/149 |
| 7,119,801 B1 | * | 10/2006 | Endo et al. ..................... 345/204 |
| 7,505,107 B2 | * | 3/2009 | Takaishi ......................... 349/149 |
| 7,564,533 B2 | * | 7/2009 | Jang et al. ..................... 349/153 |
| 7,826,023 B2 | * | 11/2010 | Grupp et al. .................. 349/149 |
| 8,395,746 B2 | * | 3/2013 | Hosoya ......................... 349/158 |
| 2001/0050799 A1 | | 12/2001 | Murade |
| 2004/0159839 A1 | | 8/2004 | Murade |
| 2004/0160399 A1 | | 8/2004 | Murade |
| 2005/0008114 A1 | | 1/2005 | Moon |
| 2005/0023521 A1 | | 2/2005 | Murade |
| 2005/0270470 A1 | * | 12/2005 | Hirakata et al. ............... 349/155 |
| 2007/0063939 A1 | * | 3/2007 | Bellamy ......................... 345/87 |
| 2010/0084653 A1 | * | 4/2010 | Yamazaki et al. .............. 257/43 |

FOREIGN PATENT DOCUMENTS

| | | |
|---|---|---|
| JP | 10-198285 A | 7/1998 |
| JP | 11-202366 A | 7/1999 |
| JP | 2001-100217 A | 4/2001 |
| JP | 2003-177681 A | 6/2003 |
| JP | 2005-050502 A | 2/2005 |

OTHER PUBLICATIONS

Yoshida et al.; "Active Matrix Substrate and Active Matrix Display Device"; U.S. Appl. No. 13/383,218, filed Jan. 10, 2012.

* cited by examiner

DISPLAY PANEL AND DISPLAY APPARATUS

TECHNICAL FIELD

The present invention relates to a display panel and a display apparatus. More particularly, the present invention relates to a display panel and a display apparatus that are suitable for a space-saving type display apparatus whose driving circuit (driver) is (monolithically) incorporated in a display panel.

BACKGROUND ART

Liquid crystal display apparatuses have been used in various fields because of their advantageous features such as small thickness, light weight and low power consumption. Among the liquid crystal display apparatuses, the active matrix type liquid crystal display apparatus, in which thin-film transistors (TFTs) are used as pixel switching elements (driving elements), has high performance, such as high contrast ratio and high response speed, and hence has been mainly used in a monitor of a personal computer, a portable TV apparatus, and the like. Therefore, the market scale of the active matrix type liquid crystal display apparatus has been significantly increasing.

Meanwhile, in recent years, in the field of liquid crystal display apparatus, a driving circuit integrated type liquid crystal display apparatus, in which a peripheral driving circuit (driver circuit) for driving a liquid crystal display panel is formed (in which the peripheral driving circuit is monolithically formed) on the same substrate as the substrate having pixel TFTs, and the like, arranged thereon in a matrix form, has been mass-produced. This is because, with the driving circuit integrated type liquid crystal display apparatus, it is possible to obtain features such as, reduction of the picture-frame and the thickness of the panel, cost reduction by elimination of integrated circuit (IC) chips for driving (reduction in the number of components of the liquid crystal display module), and reduction in the number of mounting processes.

Examples of the technique for monolithically forming the peripheral driving circuit include a technique (which may also be referred to as full monolithic technique) for monolithically forming gate drivers (scanning electrode drivers, or gate driving circuits) and source drivers (signal electrode drivers, or signal driving circuits) by using low temperature polysilicon (p-Si) and continuous grain boundary crystal silicon (CGS), and a technique for monolithically forming only gate drivers by using amorphous silicone (a-Si). At present, the former technique tends to be used. On the other hand, as compared with the former technique, the latter technique has such advantages that the process temperature is low, that low-cost glass can be used, that the number of masks is small, and that the number of processes is small. In recent years, the latter technique has also been attracting attention.

Examples of the circuit for configuring the gate driver include a shift register. Shift registers devised in various ways have been proposed (see, for example, Patent Literatures 1 to 3).

PRIOR ART REFERENCES

Patent Documents

Patent Document 1: JP 2005-50502A
Patent Document 2: JP 6-505605A
Patent Document 3: JP 8-87897A

SUMMARY OF THE INVENTION

Problems to be Solved by the Invention

However, as to the shift registers described above, a method for reducing the circuit area of the shift register as much as possible has not been studied from the viewpoint of reducing the picture-frames at both ends of the display panel. Further, there has been no suggestion of the relationships of the wiring arrangement in the circuit section with the wiring resistance based on the arrangement and with the area occupied by the wiring in the circuit.

The conventional liquid crystal display panel has, for example, a configuration of a liquid crystal panel and a gate driver as shown in FIGS. 16 and 17.

In FIG. 16, a black matrix (BM, light-shielding film) 3 is arranged on an opposed substrate so as to correspond to a picture-frame area 2.

The number of trunk wirings 6 provided on a TFT side substrate shown in FIG. 17 is as many as six, and the width of the trunk wirings is large to prevent the delay of signals. Further, also in the transistors of the driving circuit section transistor group, especially in the transistors based on the gate monolithic technique of amorphous silicon thin film transistor (a-Si TFT) liquid crystal, the mobility of amorphous silicone (a-Si) is small, and hence the size of the transistors in monolithic circuit section is tend to be increased. Therefore, the picture-frame area of the liquid crystal panel tends to be increased.

In the conventional display panel, particularly, in small and medium size display panel for portable telephones and digital cameras in which the picture-frame size is generally required to be reduced, and also recently in large-size display panels used for, for example, notebook PC monitors, there is still a room for improvement in further reduction of the picture-frame area.

The present invention has been made in view of the above described circumstances. An object of the present invention is to provide a display panel and a display apparatus which can reduce the picture-frame area around the display surface while sufficiently preventing the delay of signals.

Means for Solving the Problems

The present inventors made various investigations about a method for reducing the picture-frame area (for narrowing the picture-frame) of a display panel which includes a circuit substrate with transistors of a circuit section provided thereon, and an opposed substrate facing the circuit substrate, and in which the circuit section is arranged in the picture-frame area, and focused on relationships of the arrangement of the wirings of the circuit section with the wiring resistance based on the arrangement and with the area occupied by the wirings in the circuit section. Then, the present inventors found out that, in the circuit section including trunk wiring (signal trunk wiring) and branch wiring (signal branch wiring) electrically connected to the trunk wiring via a conductor, the wiring resistance and the area occupied by the wiring in the circuit can be reduced by devising the arrangement of the trunk wiring and the branch wiring in the circuit section, and thereby the picture-frame area required to arrange the circuit section can be reduced (narrowed) while the delay of signals is sufficiently prevented. As a result, the present inventors came up with an idea that, with such arrangement of the wiring, the above described problems can be effectively solved, and reached the present invention.

That is, the present invention is to provide a display panel including a circuit substrate, and an opposed substrate facing the circuit substrate, the display panel being featured in that the circuit section is arranged in the picture-frame area of the display panel, in that the circuit section includes trunk wiring and branch wiring connected to the gate electrode or the source electrode of a transistor in the circuit section, in that all or a part of the trunk wiring is provided on the opposed substrate, and in that the branch wiring is provided on the circuit substrate so as to be electrically connected to the trunk wiring via a conductor.

The present invention is also to provide a display apparatus provided with the display panel described above.

In the following, the present invention will be described in detail.

The display panel of the present invention includes a circuit substrate and an opposed substrate facing the circuit substrate. The circuit substrate and the opposed substrate are the components of the display panel. Usually, the circuit substrate is a substrate (back substrate) arranged on the back surface side, and the opposed substrate is a substrate (observation surface side substrate, front substrate) arranged on the observation surface side.

Note that optical elements, such as liquid crystal display elements (optical elements each having a pair of electrodes and a liquid crystal layer sandwiched between the pair of electrodes), and electroluminescence (EL) elements (optical elements each having a pair of electrodes and an EL layer sandwiched between the pair of electrodes), are usually arranged between the circuit substrate and the opposed substrate in the display area. In the case of an active matrix system, the pair of electrodes are configured by a pixel electrode and a common electrode. In the liquid crystal display element, the pixel electrode of the pair of electrodes is usually arranged on the back surface side of the liquid crystal layer. Further, the common electrode of the pair of electrode is usually arranged on the front surface side of the liquid crystal layer.

Transistors having a large size are required in order to allow a large amount of current to flow through the circuit section. Further, it is also preferred to reduce the wiring resistance of the signal lines for supplying a clock signal, and the like, to the transistors, and the like, provided in a gate driver, in order to prevent the delay of signals, and hence the width of the wiring is required to be increased. As a result, the picture-frame size of the display panel tended to be increased.

In the present invention, all or a part of the trunk wiring of the gate driver, which wiring is conventionally provided only on the circuit substrate, is provided on the opposed substrate.

The configuration in which all or a part of the trunk wiring is provided on the opposed substrate may be a configuration in which one of a plurality of trunk wirings is provided on the opposed substrate, or may be a configuration in which a part of one trunk wiring is provided on the opposed substrate so as to form a redundant structure.

When the wiring resistance is reduced by this configuration, the amount of current flowing through the circuit can be increased, and the delay of the signals can be sufficiently prevented. Further, when the area occupied by the wiring in the circuit is reduced, the picture-framing area for arranging the circuit section can be reduced (narrowed). For example, in the panel with a gate driver monolithically integrated therein, it is possible to reduce the size of the picture-frames used as the circuit location sections and located at both ends of the panel.

The circuit section is usually configured by trunk wiring for supplying a clock signal, and the like, to the transistor in the circuit section, branch wiring for connecting the trunk wiring to the gate electrode or the source electrode of transistor of the circuit section, the transistors of the circuit section, and wiring for mutually connecting the gate electrodes or the source electrodes of the transistors of the circuit section.

The circuit section arranged in the picture-frame area of the display panel of the present invention is not particularly limited, and examples thereof include a gate driver (gate driving circuit), a source driver (source driving circuit), a power source circuit, a photo-sensor circuit, a temperature sensor circuit, a level shifter, and the like. Examples of the configuration of the gate driver include a configuration formed by a shift register and a buffer for temporarily hold a selection pulse sent from the shift register. Examples of the configuration of the source driver include a configuration formed by video lines to each of which a pixel signal is applied, a sampling circuit which outputs the pixel signal of each of the video lines to each of data lines, and a shift register which controls the operation timing of the sampling circuit.

Examples of a preferred configuration of the display panel of the present invention include a configuration in which the circuit section includes a gate driver.

In a liquid crystal panel with a gate driver monolithically integrated therein, a gate driver (configured by trunk wiring, branch wiring for connecting the trunk wiring to the gate or source of transistor of the circuit section, the transistors of the circuit section, each of wiring parts for mutually connecting the gate or source electrodes of the transistors in the circuit section) is usually arranged in the picture-frame section at each end of the panel. For this reason, the picture-frame width is determined by the size and the number of each of the parts of the gate driver. Here, for example, in such a case where the width of the wiring needs to be increased to prevent the delay of the signals, the picture-frame width tends to be increased. However, in the present invention, the picture-frame area, in which the circuit section is arranged, can be reduced while the delay of the signal is sufficiently prevented.

For example, the circuit section in the display panel of the present invention is preferably a gate driver monolithically integrated in a liquid crystal panel.

Note that, in the configuration in which the circuit section includes the gate driver, the source driver may only supply signals for driving transistors, and the like, provided in the pixel section. Examples of the source driver include a monolithic type source driver, a TCP type source driver, a flexible printed circuit (FPC), and the like. The present invention can be suitably applied to the monolithic type source driver similarly to the gate driver.

Examples of a preferred configuration of the display panel of the present invention include a configuration in which all or a part of the above-described transistors are amorphous silicon thin film transistors. In other words, it is preferred that the circuit section includes amorphous silicon thin film transistors.

Microcrystalline silicon (μc-Si), p-Si, CGS, and oxide semiconductor (for example, indium gallium zinc composite oxide [IGZO], and the like) have high mobility, whereas the mobility of amorphous silicone (a-Si) is low. Therefore, the size of amorphous silicon thin film transistor (a-Si TFT) tends to be increased, so that the picture-frame size of the display panel tends to be increased. Therefore, the present invention is particularly preferred when the circuit section includes a-Si TFTs.

As one of preferred configurations of the display panel of the present invention, a configuration is preferred in which all or a part of trunk wiring provided on the opposed substrate is formed of an opposed electrode material. Preferable examples of the opposed electrode material include indium tin oxide (ITO), indium zinc oxide (IZO), and the like.

The process of forming the trunk wiring provided on the opposed substrate can be performed simultaneously with the process of forming the opposed electrode in the display area. Thereby, the trunk wiring and the opposed electrode which are provided on the opposed substrate can be formed by the same process, and hence the manufacturing process can be simplified.

Examples of a preferred configuration of the display panel of the present invention include a configuration in which all or a part of the trunk wiring provided on the opposed substrate are formed of a metallic black matrix material.

In the display panel of the present invention, an opposed electrode material is used as the material of the wiring provided on the opposed substrate in the configuration described below. However, the same material as that used for the metallic black matrix (metal BM) provided on the color filter side may also be used, and thereby the effect of the present invention can also be obtained.

The branch wiring is electrically connected to the trunk wiring via a conductor.

The electrical connection between the trunk wiring and the branch wiring section may be effected via a conductor. However, from the viewpoint of simplifying the manufacturing process, it is preferred that the trunk wiring and the branch wiring section are electrically connected to each other by using the same transparent electrode material as that used for the pixel electrode.

Note that the trunk wiring may include trunk wiring which is not electrically connected to the branch wiring.

As one of preferred configurations of the display panel of the present invention, a configuration is preferred in which a part of the trunk wiring is arranged on a spacer formed on the opposed substrate, and in which the trunk wiring arranged on the spacer is connected to the conductor.

As long as the display panel of the present invention is a display panel including, as components thereof, the circuit substrate, the opposed substrate, and the circuit section, the display panel of the present invention may or may not include other members as components thereof, and is not particularly limited. For example, the display panel of the present invention may be an active matrix type display panel which includes, on the circuit substrate, gate wirings (scanning lines), source wirings (signal lines) crossing the gate wirings, and pixel TFTs respectively arranged on the intersections between the gate wirings and the source wirings. The display panel of the present invention can be suitably used for an active matrix type display panel, an electroluminescent display panel, and the like.

The preferred configurations of the display panel of the present invention will be described in detail below.

Examples of a preferred configuration of the display panel of the present invention include a configuration in which the trunk wiring has a redundant structure configured such that a wiring section provided on the circuit substrate, and a wiring section provided on the opposed substrate are connected in parallel with each other.

As described above, the trunk wiring is conventionally provided only on the circuit substrate. Usually, six to eight lines of the trunk wiring are provided, and the wiring have, in many cases, a large width in order to prevent the delay of signals. To cope with this, when the trunk wiring is formed to have the redundant structure (double wiring structure) in which the wiring section provided on the circuit substrate and the wiring section provided on the opposed substrate are connected in parallel with each other, the wiring resistance and the width of the trunk wiring can be reduced, so that the circuit area can be reduced while excellent electrical characteristics are sufficiently maintained. Thereby, the picture-frame area can be reduced.

Especially, a configuration is preferred which forms an area where the trunk wiring provided on the circuit substrate is covered with the trunk wiring provided on the opposed substrate and connected in parallel with the trunk wiring provided on the circuit substrate in the plan view from the substrate normal direction.

In the liquid crystal display panel of the present invention, it is preferred that the trunk wiring provided on the circuit substrate is formed of a gate electrode material or a source electrode material of the transistor provided in the circuit section.

The process of forming the trunk wiring provided on the circuit substrate can be performed simultaneously with the process of forming the gate electrode or the source electrode of the transistor provided in the circuit section. Thereby, the trunk wiring provided on the circuit substrate and the gate electrode or the source electrode of the transistor provided in the circuit section can be formed by the same process, and hence the manufacturing process can be simplified.

Similarly, it is preferred that the trunk wiring is also formed of the gate electrode material or the source electrode material of the transistor provided in the circuit section.

The effect of reduction of the resistance will be described below.

The combined resistance R of a parallel circuit is expressed by the following expression, when the sheet resistances of the two wirings arranged in parallel with each other are set to $R_1$ and $R_2$, respectively.

Combined resistance R; $1/R=1/R_1+1/R_2$ (parallel circuit)

When the ratio of the two sheet resistances is assumed as $a:b$, the resistance value of the wirings in the present invention is reduced to $a \times b/(a+b)$ times. For this reason, the width of the wirings having the same film thickness can be reduced in the same ratio.

For example, when the sheet resistance ratio of a gate electrode material and an opposed electrode material is assumed as 1:2, the wiring resistance value in the case of using the trunk wiring having the redundant structure, in which the wiring section provided on the circuit substrate and the wiring section provided on the opposed substrate are connected in parallel with each other, becomes ⅔ times the wiring resistance value in the case of using the trunk wiring provided on the conventional circuit substrate. Therefore, the width of the trunk wiring can be reduced to ⅔ times while allowing the required amount of current to flow.

In the display panel of the present invention, the trunk wiring and the branch wiring are usually electrically connected to each other on the side of the circuit substrate via a conductor. In a preferred configuration of the present invention, the trunk wiring provided on the circuit substrate and the trunk wiring provided on the opposed substrate are brought into contact with each other by using the conductor.

In this way, when the trunk wiring is formed to have the redundant structure, the resistance of the trunk wiring can be reduced.

For example, it is preferred that, after a spacer 9 used to maintain the cell gap between the circuit substrate and the opposed substrate is formed on the side of the opposed substrate as shown in FIG. 5, the opposed electrode material is patterned. Thereby, a structure for securing the electric conduction can be formed.

Note that all of the trunk wirings of the display panel of the present invention need not have the redundant structure, and one of the signal wirings may have the redundant structure. Thereby, the effect of reducing the wiring resistance is obtained, and hence the picture-frame size can be reduced.

Further, in a preferred configuration of the present invention, as shown in FIG. 4, the wiring provided on the opposed substrate and the trunk wiring provided on the circuit substrate are formed to have the same width so that the former wiring covers the latter wiring. However, the redundant structure may be suitably configured according to the sheet resistance of the opposed electrode material, and the film thickness, the picture-frame size and a desired resistance value, and need not be necessarily be applied to all the signal wirings.

Note that, when the redundant structure is applied to an arbitrary trunk wiring, the resistance of which is to be reduced, the other trunk wirings and the wirings provided on the opposed substrate may be provided so that the former wirings are covered with the latter wirings. However, in this case, it is preferred that the spacer is provided so as to prevent the other trunk wirings from being brought into contact with the wirings provided on the opposed substrate.

Examples of a preferred configuration of the display panel of the present invention include a configuration in which the circuit section includes a wiring used to input a signal into one or more stages of a shift register circuit, the wiring being extended from an input chip to the one or more stages of the shift register circuit through a conductor located in one of the four corners of the display panel, the picture-frame area of the opposed substrate, a conductor other than the conductor located in the one of the four corners of the display panel, and the picture-frame area of the circuit substrate, and in which the wiring passing through the picture-frame area of the opposed substrate intersects with other wirings provided on the circuit substrate. The "four corners" mean four corners in the outer edges (non-display areas) of the display panel. The "input chip" may be an integrated circuit which inputs a signal into the shift register circuit. Further, the integrated circuit may be provided on the circuit substrate, and may also be configured to input a signal from an external chip connected by a TCP connection, and the like, to the wiring provided on the circuit substrate. However, the integrated circuit provided on the circuit substrate is preferred. The "stage" means a repetition unit, a plurality of which configure the shift register circuit, and to and/or from which a signal is successively input and/or output. In the case where the wiring is a CLR signal wiring and/or a GSP signal wiring, the "one or more stages" usually mean one stage, and preferably the first stage or the last stage of the shift register circuit. Further, in the case where the wiring is a CK signal wiring, the "one or more stages" may mean one or more stages of the shift register circuit, and preferably mean all the stages of the shift register circuit. In other words, in this case, a configuration in which a signal is input into all the stages of the shift register circuit is preferred. The "other wiring" usually means the trunk wiring or the branch wiring provided on the circuit substrate.

With the configuration in which the above-described wiring passing through the picture-frame area of the opposed substrate intersects with other wirings provided on the circuit substrate, the capacitance (which may also be referred to as cross capacitance) in the crossing section can be reduced as compared with the case where the wiring is provided on the circuit substrate.

The cross capacitance causes the up and/or down transitions in the output waveform of the gate. For this reason, the size of the transistors is designed with a sufficient margin in the usual circuit design. Thereby, the picture-frame size is inevitably increased.

In the above-described configuration, the distance (corresponding to the cell gap) between the TFT side source electrode and the CF side opposed electrode is sufficiently large as compared with the usual film thickness between the gate and source layers, and hence the influence of the cross capacitance can be almost neglected.

Therefore, in the usual circuit design, the picture-frame size inevitably becomes large because of the above-described reason. However, in the above-described configuration, the influence of the cross capacitance between the trunk wiring and the branch wiring can be reduced, and hence the circuit design with a suitable margin can be performed.

In other words, when all or a part of trunk wiring conventionally formed on the side of the circuit substrate by using a gate electrode material, and the like, is formed on the opposed substrate, the influence of the cross capacitance can be reduced, and hence the picture-frame size can be reduced. For example, as shown in the plan view which is shown in FIG. 8 and in which the color filter substrate covers the signal wiring section, the crossing area between the trunk wiring and branch wiring, which are provided on the circuit substrate, can be reduced by the configuration in which a part of the trunk wiring is provided on the opposed substrate (the trunk wiring and branch wiring, which are provided on the circuit substrate, overlap with each other in the portions surrounded by the dotted lines of FIG. 2, while in FIG. 8, such overlapping is eliminated in the portions surrounded by the dotted lines corresponding to the portions surrounded by the dotted lines of FIG. 2). With such configuration, the cross capacitance between the trunk wiring and the branch wiring can be reduced as compared with the case where the trunk wiring is provided on the circuit substrate as shown in FIG. 2, and hence the effect of reducing the picture-frame area can be obtained.

Especially, a configuration is particularly preferred in which an overlapping area is formed by the crossing of the trunk wiring provided on the opposed substrate and the branch wiring, and in which all or a part of the area is prevented from overlapping with the trunk wiring provided on the circuit substrate. Thereby, the influence of the cross capacitance can be further reduced.

Examples of a preferred configuration of the display panel of the present invention include a configuration in which, in the display panel, all or a part of trunk wiring closest to the display area side is provided on the opposed substrate. As shown in FIG. 8, with this configuration, the trunk wiring on the side closest to the display area is eliminated from the trunk wiring provided on the circuit substrate, and hence the effect of reducing the picture-frame area can also be obtained.

Examples of a preferred configuration of the display panel of the present invention include a configuration in which the trunk wiring includes a wiring extended to one stage of a shift register circuit and used to input a signal into the one stage, the one stage of the shift register circuit being positioned at a substrate end side provided with a conductive member located in one of the four corners of the display panel or positioned at the substrate end side opposite to the substrate end side provided with the conductive member, and in which, when the signal is input into the one stage, the stages other than the one stage are successively driven or successively reset. It is preferred that "the one stage of the shift register circuit" means the first or last stage of the shift register circuit.

In this way, when the wiring used to input the signal is replaced and provided on the opposed substrate, in other words, and when at least one of the trunk wirings provided on the opposed substrate is used as the trunk wiring for inputting the signal, the picture-frame area can be reduced by reducing the space area of the circuit, or the layout design flexibility can be improved, as compared with the case where the wiring for inputting the signal is provided on the circuit substrate.

Especially, as compared with the case where the trunk wiring is provided on the circuit substrate, the configuration, in which the trunk wiring is extended to the one stage of the shift register circuit which one stage is located on the substrate end side opposite to the substrate end side provided with the conductor located in one of the four corners of the display panel, is more preferred in that the cross capacitance produced between the trunk wiring and the branch wiring can be reduced.

For example, as shown in FIG. 14, when the input chip is arranged on the side of a panel opposed substrate end 37 which is the lower substrate end of the substrate, the one stage of the shift register circuit, which one stage is located on the substrate end side opposite to the substrate end side provided with the conductor located in one of the four corners of the display panel, means a first driving circuit 32 of the driving circuits provided in parallel with each other, the first driving circuit 32 being located on the side of the panel opposed substrate end 37a that is the upper substrate end of the substrate.

Further, for example, as shown in FIG. 15, when the input chip is arranged on the side of the panel opposed substrate end 37 which is the lower substrate end of the substrate, the one stage of the shift register circuit, which one stage is located on the substrate end side provided with the conductor located in one of the four corners of the display panel, means a driving circuit 35 that is the final stage of the shift register circuit and is located on the side of the panel opposed substrate end 37.

Preferred examples of the wiring used to input the signal include gate start pulse (GSP) signal wiring, clear (CLR) signal wiring, and the like.

In the shift register circuit included in the gate driver, the stages other than the first stage can be driven by using, as a trigger, the output of the preceding stage (or the further preceding stage). When the shift register circuit is driven, the input of the GSP signal is needed only for the first stage of the shift register circuit, and hence at least one GSP trunk wiring may be provided for one gate driver provided in the picture-frame area. It is preferred that the trunk wiring provided on the opposed substrate includes the wiring used to input the GSP signal into the first stage of the shift register circuit, and that the second stage and the subsequent stages of the shift register circuit are successively driven by the GSP signal being input into the first stage.

Further, the CLR signal input into the final stage of the shift register circuit is used to successively reset the stages from the final stage to the first stage of the shift register circuit in the reverse direction in the case of driving by the GSP signal, and hence the stage necessary for inputting the CLR signal is the final stage of the shift register circuit. Therefore, at least one CLR trunk wiring may be provided for one gate driver arranged in the picture-frame area. It is preferred that the trunk wiring provided on the opposed substrate includes the wiring used for inputting the CLR signal into the final stage of the shift register circuit, and that the stages from the final stages to the first stage of the shift register circuit are successively reset by the CLR signal being input into the final stage.

Note that, in the preferred configuration, the signal which is input to successively drive or successively reset the gate driver is input by the wiring provided on the opposed substrate.

Note that, in the present specification, the trunk wiring may be, for example, power source voltage (VSS) signal wiring, clock (CK) signal wiring, clock bar (CKB) signal wiring, negative power source voltage (VDD) signal wiring, power source voltage (VSS2, whose voltage is different from that of VSS) signal wiring, gate start pulse (GSP) signal wiring or clear (CLR) signal wiring.

The present invention is also to provide a display apparatus provided with the display panel of the present invention.

Since the picture-frame of the display panel can be reduced, a display apparatus with the reduced picture-frame is similarly provided.

The aforementioned modes may be employed in appropriate combination as long as the combination is not beyond the spirit of the present invention.

Effect of the Invention

With the display panel of the present invention, all or a part of the trunk wiring is provided on the opposed substrate. Thereby, the circuit section can be reduced, and also the picture-frame area, in which the circuit section is provided, can be reduced, while excellent electric characteristics of the display panel are sufficiently maintained.

Figure 12:
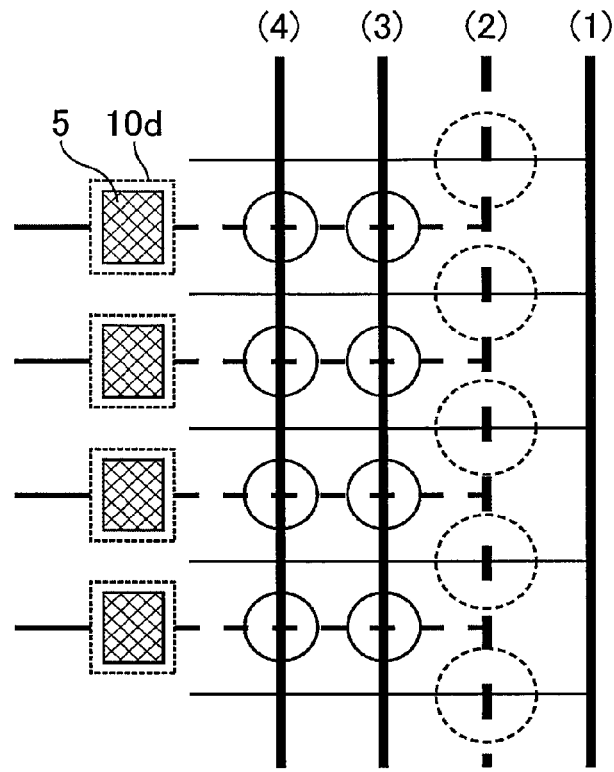

FIG. 12 is a schematic plan diagram showing a configuration of signal wiring of a gate driver section of a modification of Embodiment 2.

Figure 13:
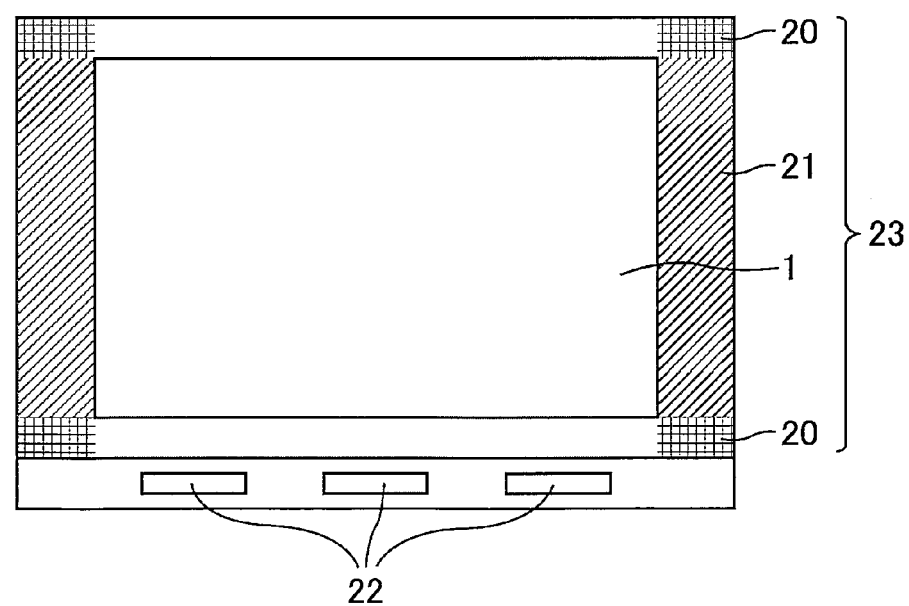

FIG. 13 is a schematic plan diagram showing a schematic view of a panel of Embodiment 3.

Figure 14:
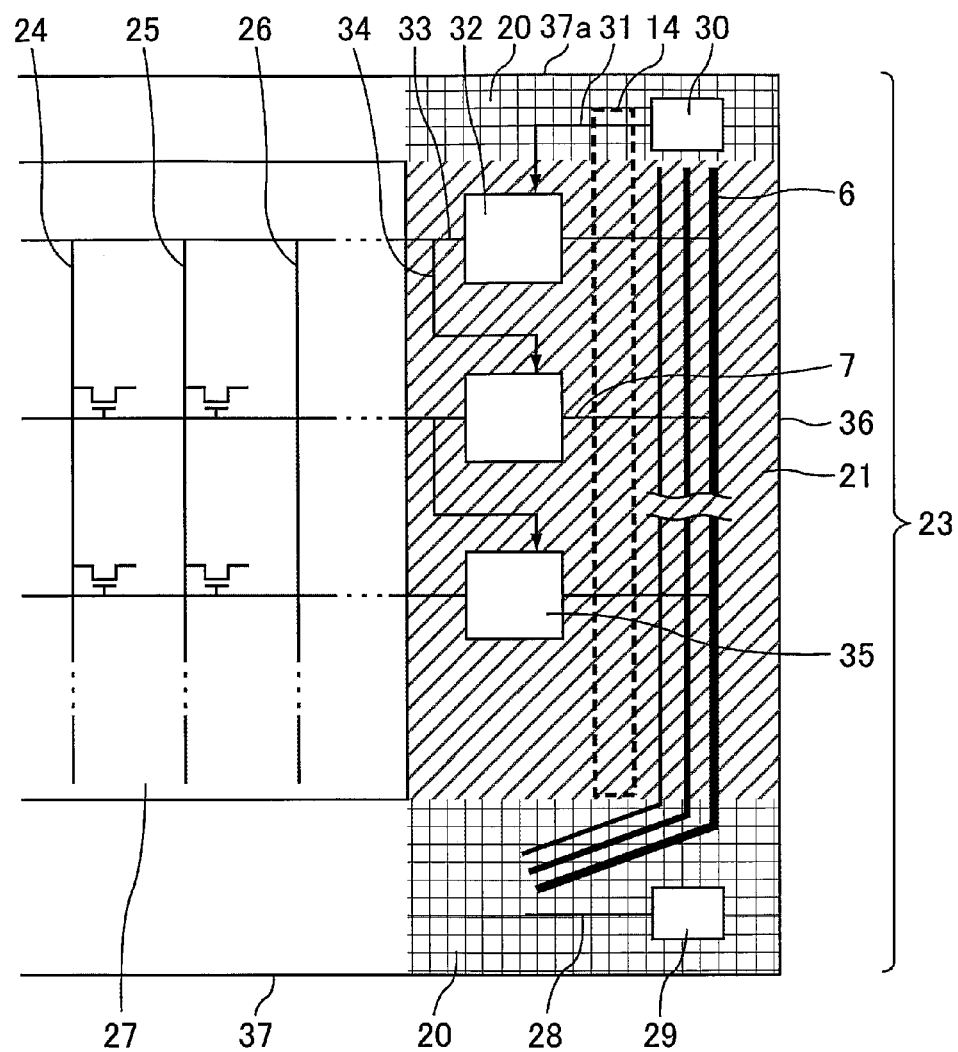

FIG. 14 is a view in which a part (right portion) of the panel of Embodiment 3 is enlarged.

Figure 15:
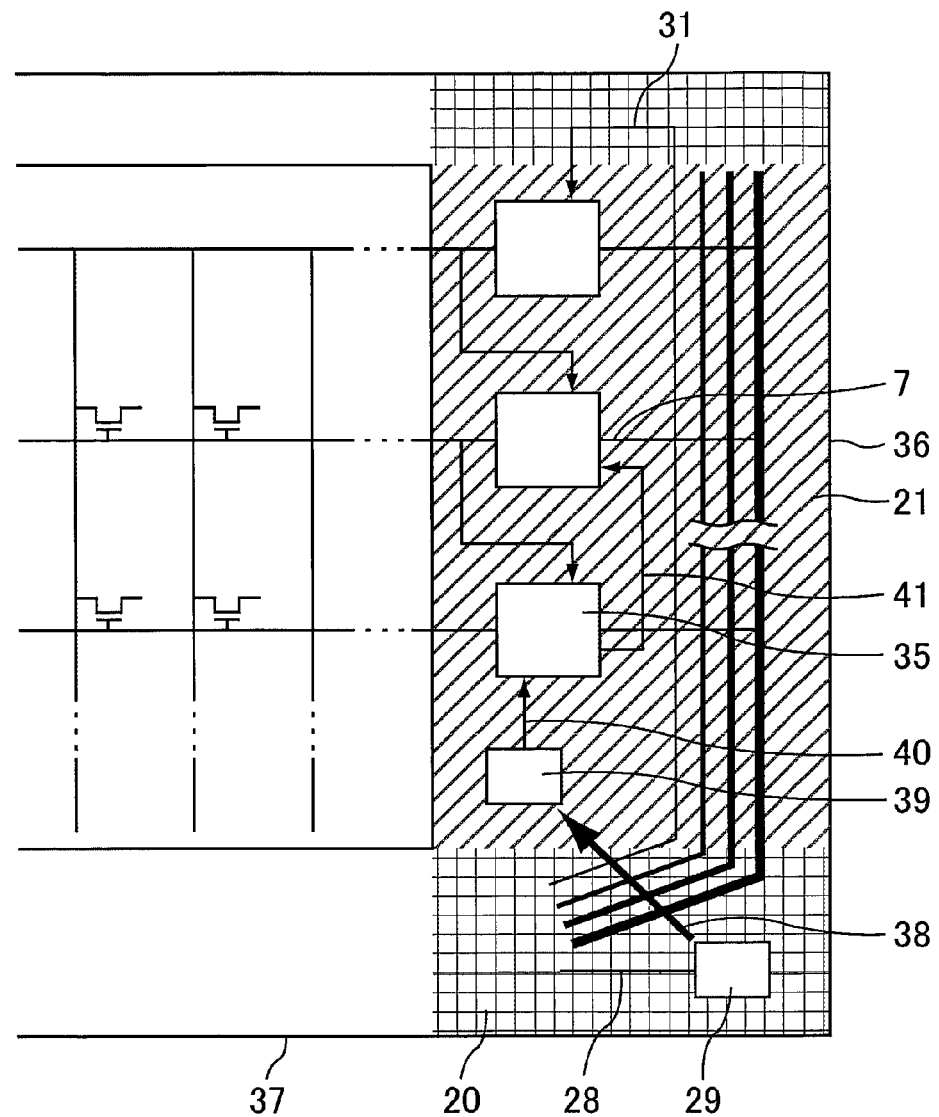

FIG. 15 is a partially enlarged view of a panel of a modification of Embodiment 3.

Figure 16:
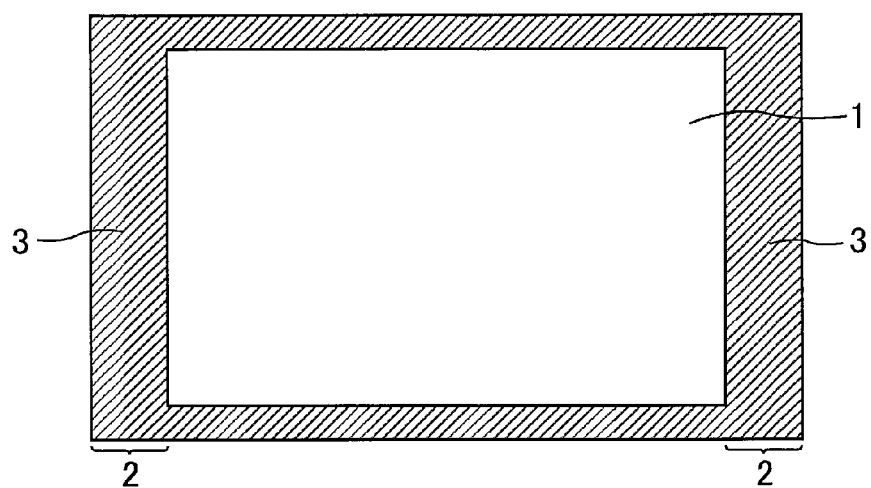

FIG. 16 is a schematic plan view of an opposed substrate of a conventional display panel.

Figure 17:
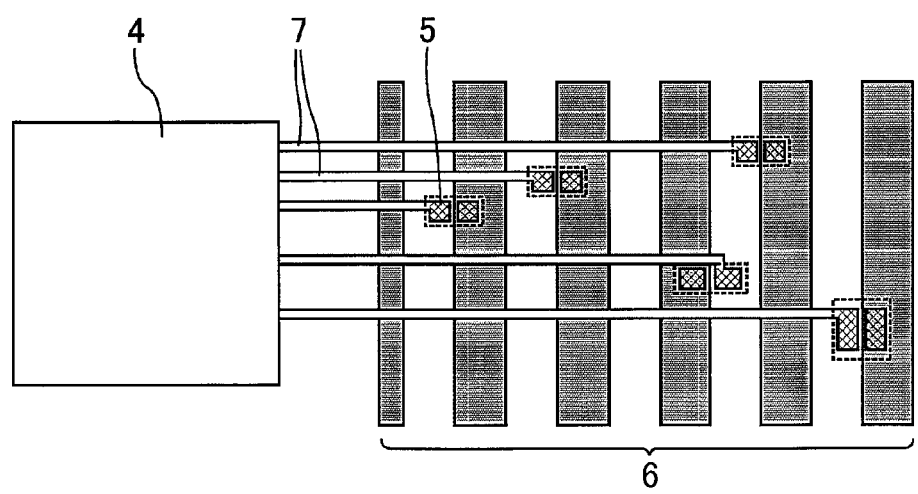

FIG. 17 is a view showing a configuration of a gate driver of a conventional display panel.

MODES FOR CARRYING OUT THE INVENTION

The present invention will be mentioned in more detail in the following embodiments, but is not limited to these embodiments.

The opposed electrode material means a material which is the same as the material used for forming the opposed electrode in the display area.

A circuit substrate is also referred to as a TFT side substrate. The side of the circuit substrate is also referred to as the TFT side.

The opposed substrate is a substrate on which a color filter (CF) is arranged in the embodiments, and hence is referred to as a CF side substrate. The side of the opposed substrate is also referred to as the CF side.

The picture-frame area means an area (peripheral area of the display surface) other than the display surface in the liquid crystal display panel.

Embodiment 1

Figure 1:
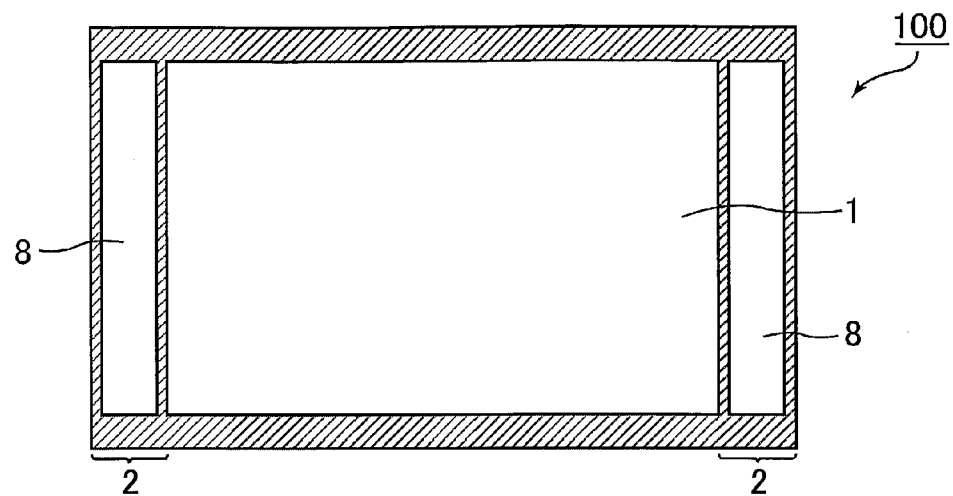
FIG. 1 is a schematic plan view of an opposed substrate of a liquid crystal display panel of Embodiment 1.

FIG. 1 is a schematic plan view of an opposed substrate of a liquid crystal display panel 100 according to Embodiment 1. The liquid crystal display panel 100 includes a pixel electrode area (display area) 1 and picture-frame areas 2 on both sides of the pixel electrode area 1.

In the picture-frame area 2, a gate driver (gate drive circuit) is arranged. In the present embodiment, the gate driver is formed on the same substrate (TFT side substrate) as the substrate of pixel TFTs, and the like. That is, the gate driver is incorporated in the liquid crystal display panel. Note that a source driver can be mounted on a TFT side substrate 19 by, for example, a chip-on glass (COG) method. A flexible printed circuit substrate (FPC) is mounted on the TFT side substrate 19, and is connected to an input terminal for receiving signals for driving the gate driver and the source driver which are provided on the TFT side substrate 19. Note that the FPC can be connected to the gate driver, for example, via the input terminal and the wiring formed on the substrate. In the case of the COG system, the signal is generally input through the path of the FPC→ACF→the wiring (including the input terminal)→ACF→the driver.

In FIG. 1, an area 8, in which trunk wiring provided on the opposed substrate is formed, is provided at a position (gate driver section) of a conventional black matrix (BM).

That is, a portion, which is provided on the opposed substrate so as to be used as the trunk wiring, is formed by patterning an opposed electrode material so as to be arranged at the position covering the gate driver section on the TFT side.

In the pixel electrode area 1, a plurality of pixel TFTs are arranged on the TFT side substrate, and on each of the plurality of pixel TFTs, a protective film, an interlayer insulating film, and a pixel electrode are laminated in this order. Note that the pixel electrode is connected to the drain electrode of the pixel TFT via a conductive film formed in the opening penetrating the protective film and the interlayer insulating film. On the other hand, a plurality of colored layers and a black matrix formed in gaps between the colored layers are arranged on the opposed substrate. The opposed electrode is arranged on the colored layer and the black matrix. In the liquid crystal display panel 100, the orientation of liquid crystal molecules is controlled by applying an electric field to the liquid crystal layer by using the pixel electrode arranged on the TFT side substrate and the opposed electrode arranged on the opposed substrate.

Figure 2:
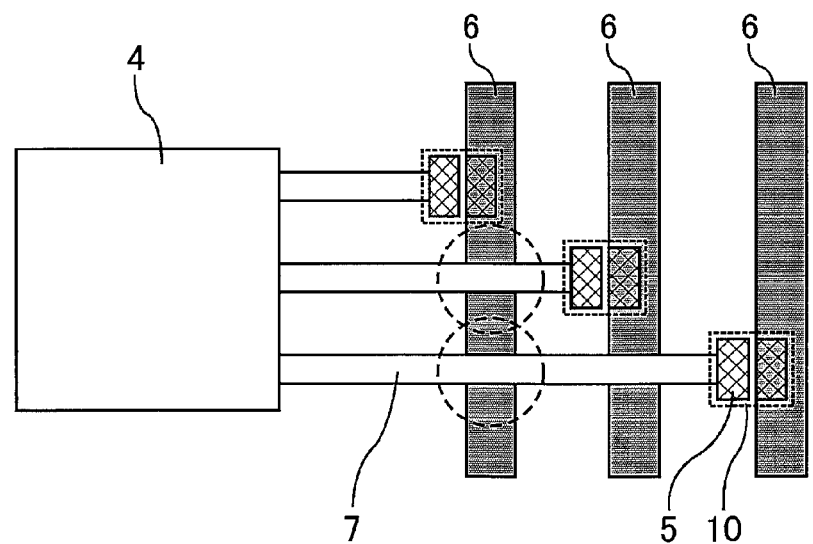
FIG. 2 is a schematic plan diagram showing a configuration of a gate driver of Embodiment 1.

FIG. 2 is a schematic plan diagram showing a configuration of the gate driver of Embodiment 1.

Trunk wirings 6 provided on the TFT side substrate are provided on the substrate (the TFT side substrate, and the back substrate) on which a gate drive circuit section transistor group 4 that is a group of transistors provided in the circuit section is provided. In the TFT side substrate, the trunk wiring 6 and branch wiring 7, which are provided on the TFT side substrate, are electrically connected to each other via a transparent electrode 10 provided so as to mutually connect two contact holes 5. The branch wiring 7 is connected to the gate electrode or the source electrode of the gate drive circuit section transistor group 4.

The transistors, which configure the shift register, and the like, in the gate driver are not illustrated but are a-Si TFTs. The a-Si TFT is located in the TFT side substrate and includes a gate electrode, a gate insulating film 13, an a-Si layer (i layer/$n^+$ layer), a source electrode, and a drain electrode. On the a-Si TFT, a protective film and an interlayer insulating film are laminated in this order toward the display surface side.

Figure 3:
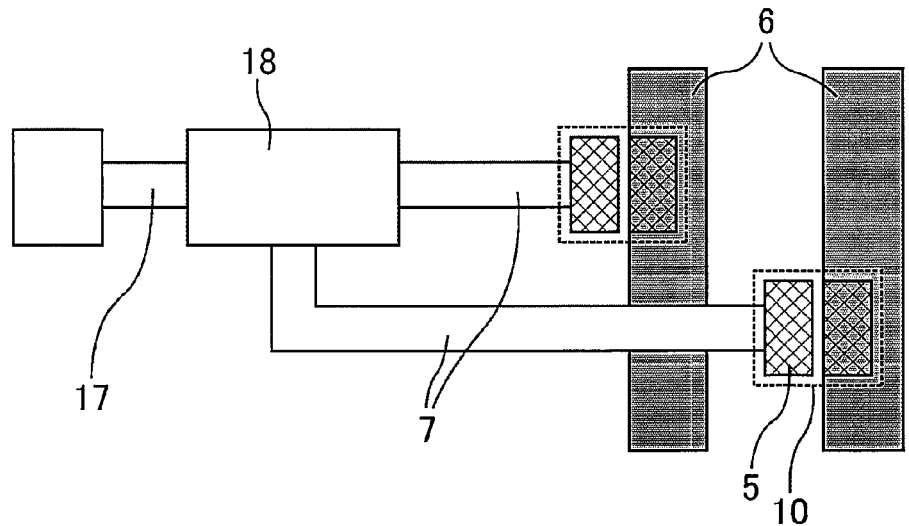
FIG. 3 is a schematic plan diagram showing trunk wirings and branch wirings of a gate driver (gate drive circuit), and wirings for connecting transistors to each other of Embodiment 1.

FIG. 3 is a schematic plan diagram showing the trunk wirings 6, the branch wirings 7, and a wiring 17 for mutually connecting transistors of the gate driver (gate drive circuit) provided on the TFT side substrate of Embodiment 1.

Note that the transistors in the pixel electrode area 1 and the gate drive circuit section transistor group 4 in Embodiment 1 are the same as those in Embodiments 2 and 3.

Figure 4:
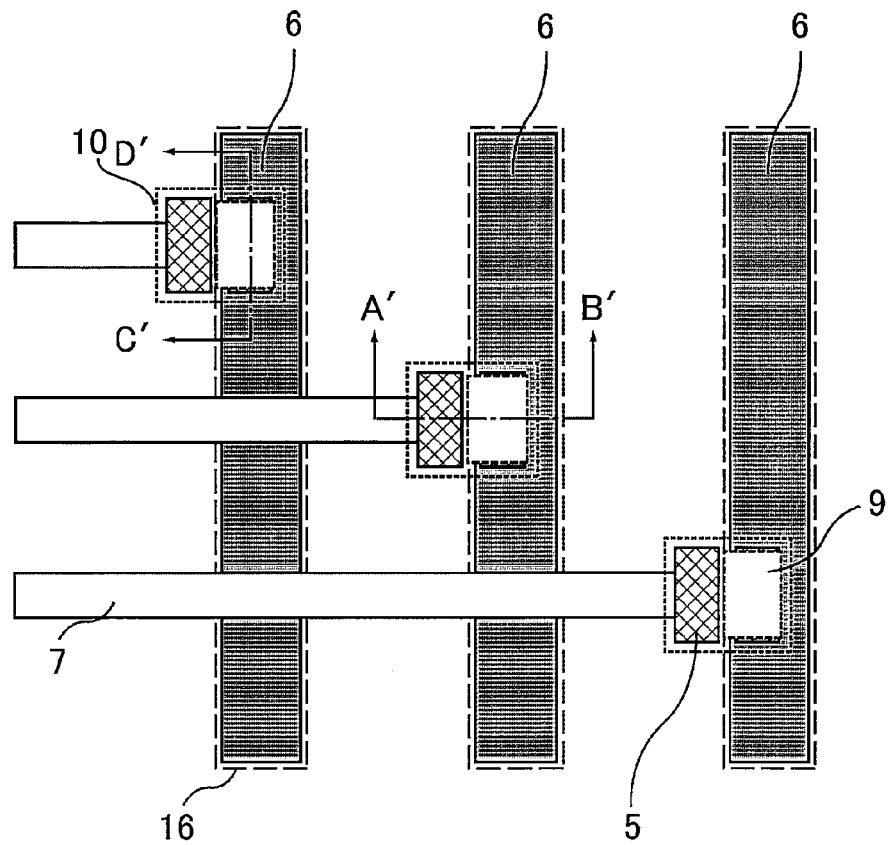
FIG. 4 is a schematic plan diagram showing the signal wiring section of the gate driver, which is covered with the color filter substrate, in the liquid crystal display panel of Embodiment 1.

FIG. 4 is a schematic plan diagram showing the signal wiring section of the gate driver, which is covered with the CF substrate and arranged in the picture-frame area of the liquid crystal display panel of Embodiment 1.

The trunk wiring 6 provided on the TFT side substrate, and trunk wiring 16, which is provided on the opposed substrate (which may also be referred to as an opposed substrate side trunk wiring and corresponds to the area surrounded by the broken line in FIG. 4), are connected to each other via the transparent electrode 10 which mutually electrically connects the trunk wiring 6 and the branch wiring 7 that are provided on the TFT side substrate.

FIG. 4 shows a redundant structure formed by each pair of the trunk wiring 6 provided on the TFT side substrate and the trunk wiring 16 provided on the opposed substrate. However, even when the double wiring structure of the present embodiment is formed by only a part of the signal wirings, the resistance reduction effect can be obtained, and hence the double wiring structure of the present embodiment is effective means to reduce the picture-frame size. Further, particularly when the inner side trunk wiring are formed to have the double wiring structure, in other words, when the trunk wiring arranged on the side closer to the display area than the trunk wiring closest to the picture-frame end side are formed to have the redundant structure, the capacitance formed in the crossing portion of the branch wiring and the trunk wiring can be reduced by narrowing the wiring on the side of the TFT substrate.

In FIG. 4, the trunk wiring 16 provided on the opposed substrate has the same width (the length in the left and right direction in FIG. 4) as that of the trunk wiring 6 provided on the TFT side substrate so as to cover the trunk wiring 6. The configuration, in which the trunk wiring 16 provided on the opposed substrate, and the trunk wiring 6 provided on the TFT side substrate have the same width so that the former trunk wiring covers the latter trunk wiring 6 in this way, is a preferred configuration of the present invention. However, the configuration can be suitably set so as to correspond to the sheet resistance and the film thickness of the opposed electrode material, the picture-frame size, and a desired resistance value, and hence need not be necessarily applied to all the signal wirings.

Further, when the configuration is applied to one arbitrary trunk wiring, the resistance of which is to be reduced, the other trunk wirings and the trunk wirings 16 provided on the opposed substrate may be arranged so that the trunk wirings 16 cover the other trunk wirings. However, in this case, it is preferred that spacers are located so as to prevent the other trunk wirings from being electrically connected to the trunk wirings 16 provided on the opposed substrate.

The covering of the wirings means the area in which the wirings (wiring group) provided on the opposed substrate cover the wirings (wiring group) provided on the substrate when the substrate is viewed from the direction of the normal of the substrate surface.

In the following, the structure of a portion at which the trunk wiring is electrically connected to the branch wiring will be described with reference to a schematic cross-sectional diagram of the portion.

Figure 5:
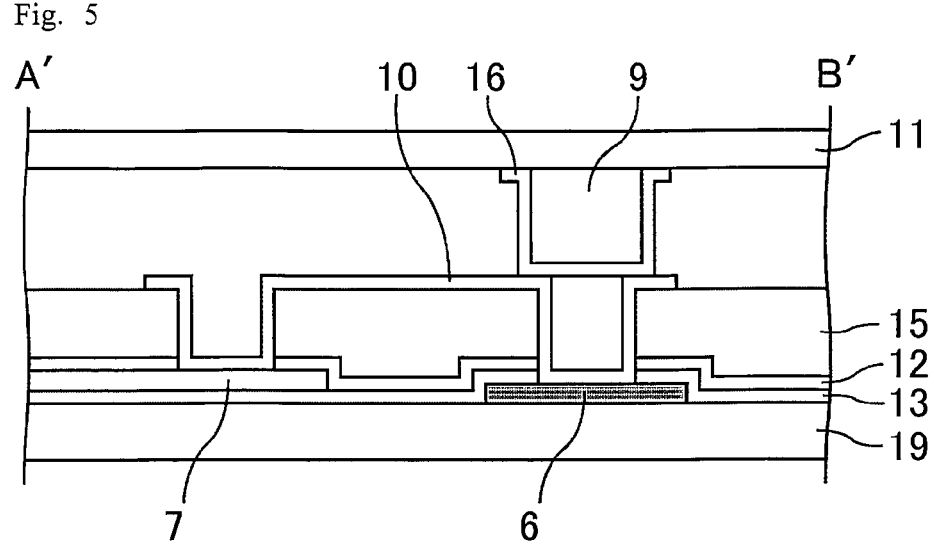
FIG. 5 is a schematic cross-sectional diagram of the liquid crystal display panel of Embodiment 1 taken along line A'-B' of FIG. 4 and showing a configuration of the connecting section between trunk wiring and branch wiring of the gate driver section.

FIG. 5 is a schematic cross-sectional diagram of the liquid crystal display panel of Embodiment 1 taken along line A'-B' of FIG. 4 and showing a configuration of the connection section between the trunk wiring and the branch wiring of the gate driver section.

Figure 6:
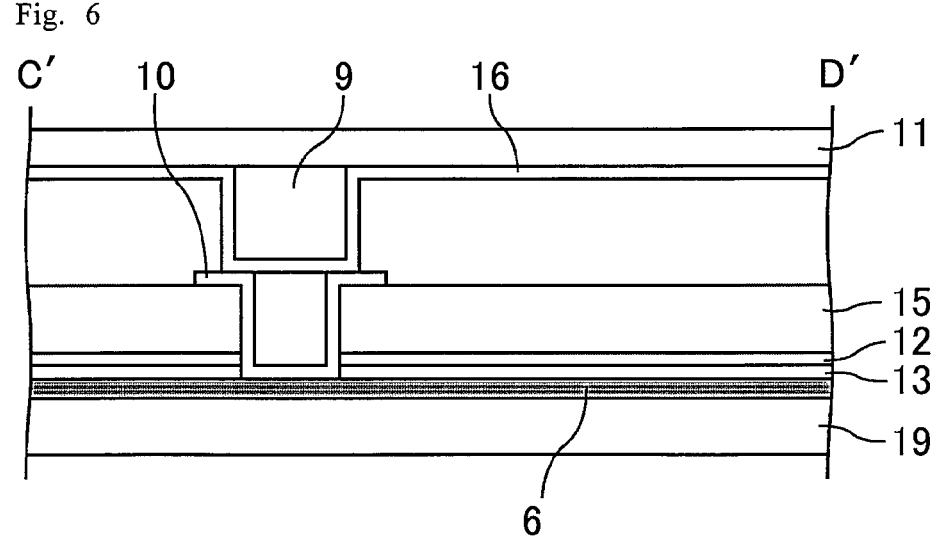
FIG. 6 is a schematic cross-sectional diagram of the liquid crystal display panel of Embodiment 1 taken along line C'-D' of FIG. 4 and showing a configuration of the connecting section between trunk wiring and branch wiring of the gate driver section.

FIG. 6 is a schematic cross-sectional diagram of the liquid crystal display panel of Embodiment 1 taken along line C'-D' of FIG. 4 and showing a configuration of the connection section between the trunk wiring and the branch wiring of the gate driver section.

As shown in FIGS. 5 and 6, the liquid crystal display panel includes the TFT side substrate (back substrate) 19 and an opposed substrate (front substrate) 11 facing the TFT side substrate 19.

The cross-sectional view of FIG. 5 shows that the trunk wiring 6 and the branch wiring 7, which are provided on the TFT side substrate, are connected to each other via the transparent electrode 10 formed between two contact holes which penetrate a gate insulating film 13, a protective film 12, and an interlayer insulating film 15.

Further, spacers 9 are provided on the opposed substrate 11. Then, the trunk wiring 16 is provided on the opposed substrate 11 by depositing and patterning an opposed electrode material. As a result, a structure is formed in which the trunk wiring 16 provided on the opposed substrate 11 is electrically connected, via the transparent electrode 10, to the trunk wiring 6 and the branch wiring 7 (not shown in FIG. 6) that are provided on the TFT side substrate.

Further, also in the cross-sectional view of FIG. 6, the trunk wiring 6 and the branch wiring 7 (not shown in FIG. 6), which are provided on the TFT side substrate, are electrically connected to each other via the transparent electrode 10 formed in the contact holes which penetrate the gate insulating film 13, the protective film 12, and the interlayer insulating film 15.

In the structure in which the trunk wiring 16 provided on the opposed substrate 11 is electrically connected to the trunk wiring 6 and the branch wiring 7 (not shown in FIG. 6) which are provided on the TFT side substrate, the trunk wiring 6 provided on the TFT side substrate and the trunk wiring provided on the opposed substrate form a redundant structure. Thereby, the wiring resistance per unit width of the trunk wiring is reduced, so that the trunk wiring can be narrowed and hence the picture-frame area can be reduced. Further, as another effect of the redundant structure, an effect of improving the yield is also obtained because, even in the case where a serious disconnection is caused between one of the trunk wirings and the connection section (contact hole) of the trunk wiring with the branch wiring, the other of the redundant trunk wirings (for example, when the disconnection is caused between the trunk wiring provided on the TFT side substrate and the connection section, the trunk wiring provided on the opposed substrate), can be used to perform the normal operation.

Note that, in Embodiment 1, the trunk wiring provided on the TFT side substrate is formed by the same process as the process for forming the gate electrode of the circuit section transistor group. The trunk wiring provided on the opposed substrate is formed by the same process as the process for forming the opposed electrode in the display area. The branch wiring is formed by the same process as the process for forming the source electrode of the circuit section transistor group. The transparent electrode is formed by the same process as the process for forming the transparent electrode in the display area. Note that examples of the material of the transparent electrode and the opposed electrode in the display area include indium tin oxide (ITO), indium zinc oxide (IZO), and the like. The spacer is a photo spacer formed by applying photosensitive resin on the substrate and exposing the photosensitive resin, and is used to maintain the cell gap between the TFT side substrate and the opposed substrate. The TFT side substrate and the opposed substrate are usually made of glass. The gate insulating film is made of silicon nitride ($SiN_x$). A photosensitive resin film, and the like, can be used as the interlayer insulating film, and examples of the forming method thereof include a photolithographic method, and the like.

The forming process and material of the members in Embodiments 1 are also the same as those in Embodiments 2 and 3.

As a modification of Embodiment 1, the trunk wiring 16 provided on the opposed substrate 11 may be configured by using a metallic black matrix. Also, the trunk wiring may be formed by the same process as the process for forming the source electrode of the circuit section transistor group. Further, the branch wiring may be formed by the same process as the process for forming the source electrode of the circuit section transistor group.

Embodiment 2

Figure 7:
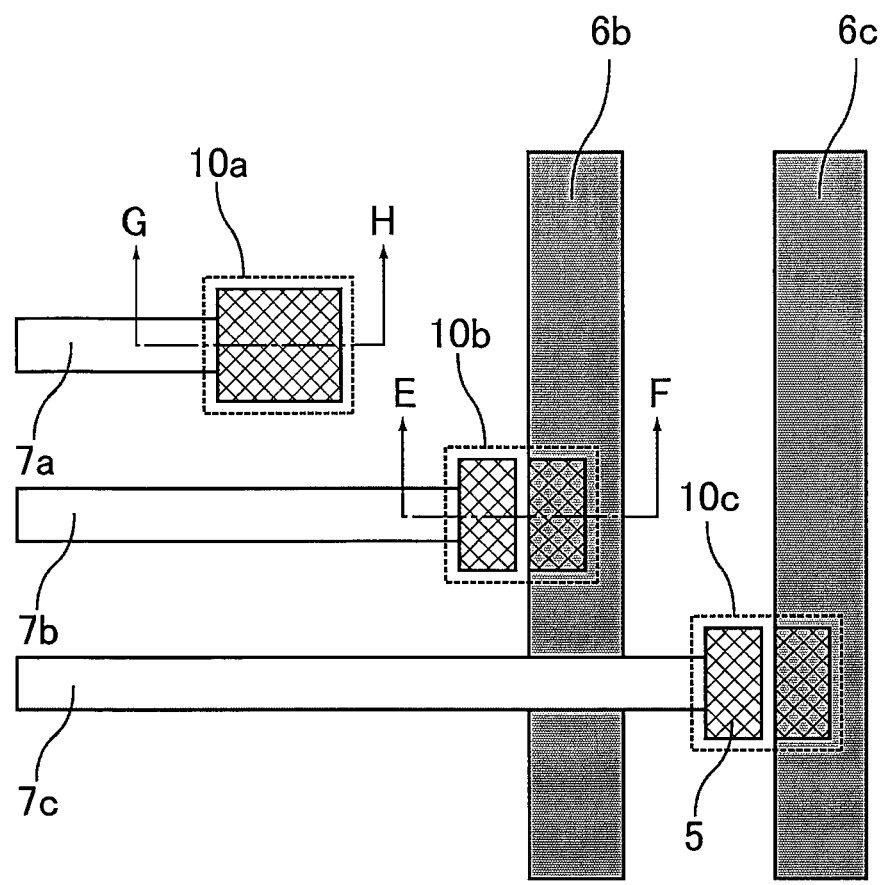
FIG. 7 is a schematic plan diagram showing a configuration of signal wiring of a gate driver section of Embodiment 2.

FIG. 7 is a schematic plan diagram showing a configuration of signal wirings of a gate driver section of Embodiment 2.

In FIG. 7, trunk wirings 6b and 6c are provided on the TFT side substrate. In the TFT side substrate, the trunk wiring 6b and the branch wiring 7b, which are provided on the TFT side substrate, are electrically connected to each other at the portion shown by the E-F via a transparent electrode 10b. Further, the trunk wiring 6c and the branch wiring 7c, which are provided on the TFT side substrate, are electrically connected to each other via a transparent electrode 10c. Note that branch wirings 7a, 7b and 7c are respectively connected to the gate electrodes or source electrodes of a gate drive circuit section transistor group (not shown). Note that, at the portion shown by the G-H line, the trunk wiring 16 and the branch wiring 7a, which are provided on the TFT side substrate, are electrically connected to each other when the signal wiring section is covered with the CF substrate as described below.

Figure 8:
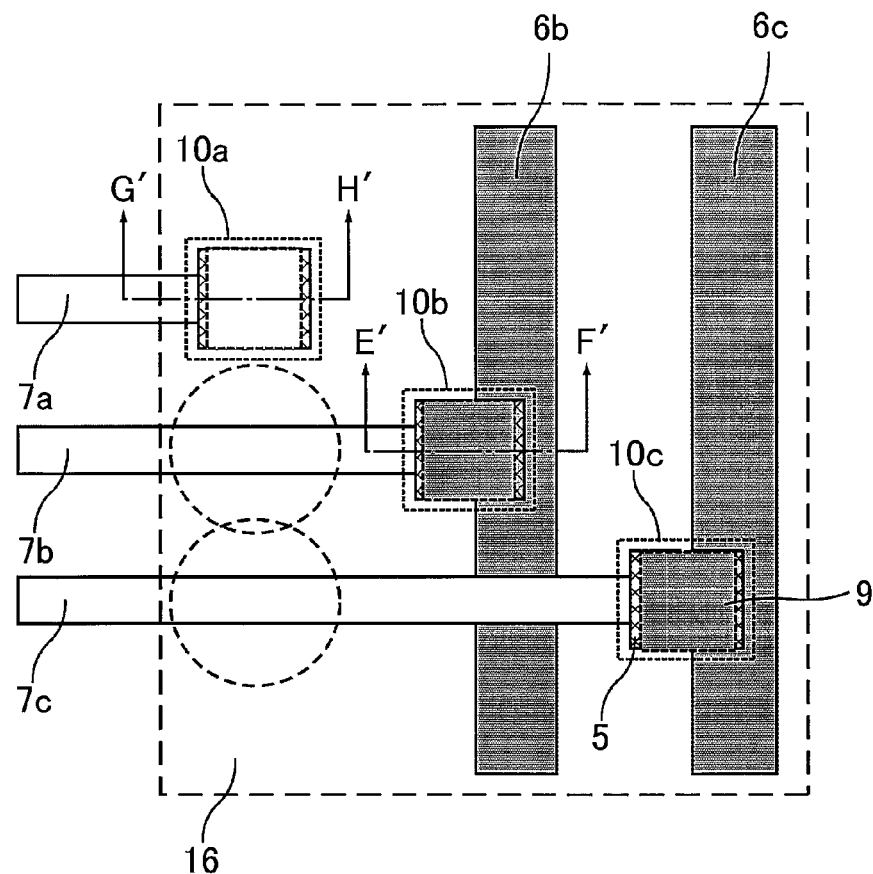
FIG. 8 is a schematic plan diagram showing the signal wiring section, which is covered with the CF substrate, in a gate driver configuration of Embodiment 2.

FIG. 8 is a schematic plan diagram showing the signal wiring section, which is covered with the CF substrate, in a gate driver configuration of Embodiment 2.

The trunk wiring 16 and the branch wiring 7a, which are provided on the TFT side substrate, are electrically connected to each other via a transparent electrode 10a at the portion shown by the line G'-H'.

FIG. 8 is a schematic view showing, as an example, the case where the inner side trunk wiring closest to the side of the display area is provided on the opposed substrate.

FIG. 8 shows a configuration in which the trunk wiring 16 provided on the opposed substrate has a wiring width so as to cover the other two trunk wirings provided on the TFT side substrate. However, the configuration can be suitably set according to the sheet resistance and thickness of the opposed electrode material, and the picture-frame size and a desired resistance value, and hence the trunk wiring 16 need not necessarily to cover the other trunk wirings provided on the TFT side substrate.

Further, when the configuration having the redundant structure, which is described in Embodiment 1 and in which the wiring section with the trunk wiring provided on the circuit substrate and the wiring section with the trunk wiring provided on the opposed substrate are connected in parallel with each other, is applied to one arbitrary trunk wiring whose resistance is to be reduced, the other trunk wirings may be arranged so as to be covered with the trunk wiring 16 provided on the opposed substrate. However, in this case, it is preferred that spacers are provided in a form capable of preventing the other trunk wiring from being electrically connected to the trunk wiring 16 provided on the opposed substrate.

In the following, the structure of the portion, at which the trunk wiring is electrically connected to the branch wiring, will be described with reference to a schematic cross-sectional diagram of the portion.

Figure 9:
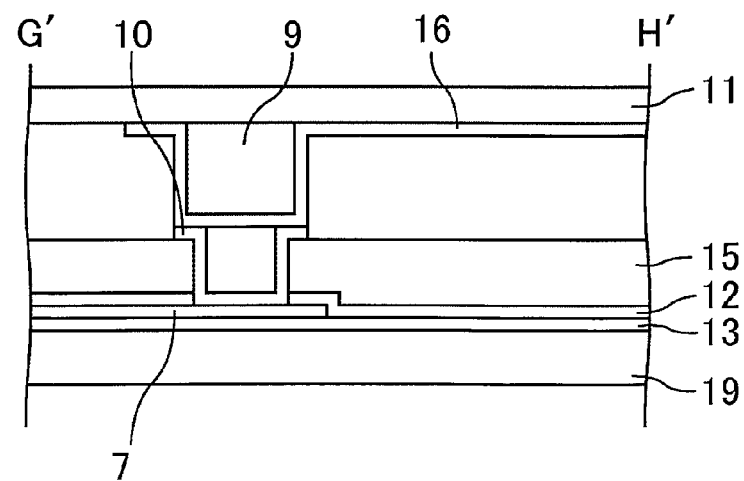
FIG. 9 is a schematic cross-sectional diagram of the liquid crystal display panel of Embodiment 2 taken along line G'-H' of FIG. 8 and showing a configuration of the connecting section between trunk wiring and branch wiring of the gate driver section.

FIG. 9 is a schematic cross-sectional diagram of the liquid crystal display panel of Embodiment 2 taken along line G'-H' of FIG. 8 and showing a configuration of the connection section between the trunk wiring 16 and the branch wiring 7 provided on the opposed substrate of the gate driver section.

Figure 10:
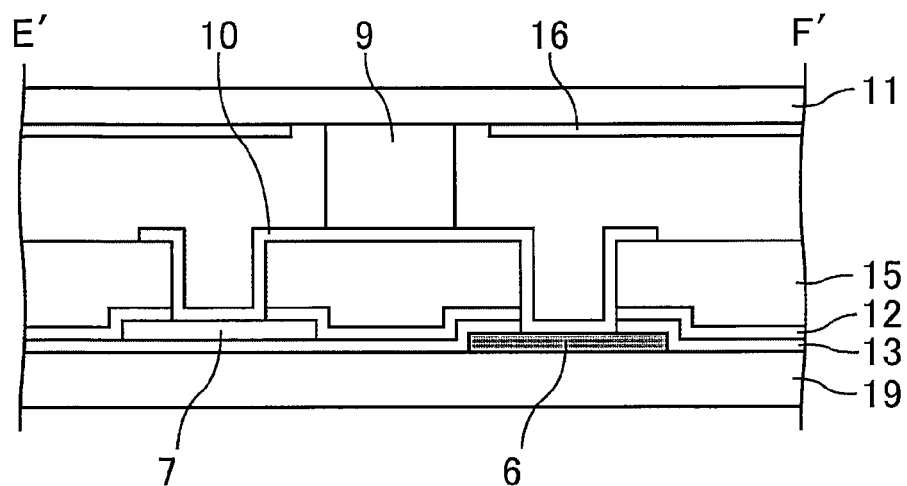
FIG. 10 is a schematic cross-sectional diagram of the liquid crystal display panel of Embodiment 2 taken along line E'-F' of FIG. 8 and showing a configuration of the connecting section between trunk wiring and branch wiring of the gate driver section.

FIG. 10 is a schematic cross-sectional diagram of the liquid crystal display panel of Embodiment 2 taken along line E'-F' of FIG. 8 and showing a configuration of the connection section between the trunk wiring 6 and the branch wiring 7 which are provided on the TFT side substrate of the gate driver section. FIG. 10 shows a configuration in which the periphery of the spacer is patterned so that the trunk wiring 16 provided on the opposed substrate is prevented from being electrically connected to the wiring provided on the TFT side substrate.

Figure 11:
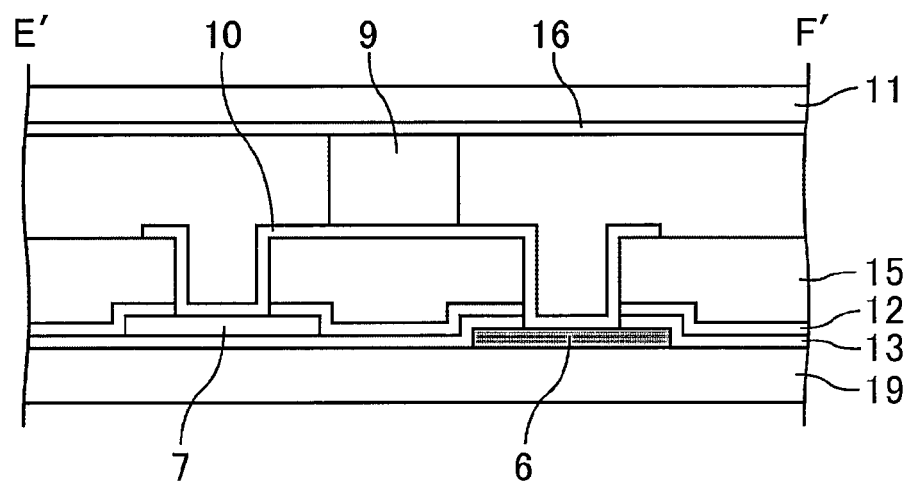
FIG. 11 is a schematic cross-sectional diagram of the liquid crystal display panel of Embodiment 2 taken along line E'-F' of FIG. 8 and showing another configuration of the connecting section of trunk wiring and branch wiring of the gate driver section.

FIG. 11 is a schematic cross-sectional diagram of the liquid crystal display panel of Embodiment 2 taken along line E'-F' of FIG. 8 and showing another configuration of the connection section between the trunk wiring 6 and the branch wiring 7 which are provided on the TFT side substrate of the gate driver section. FIG. 11 shows a configuration in which, in the case where the trunk wiring 16 provided on the opposed substrate is not electrically connected to the wiring provided on the TFT side substrate, a spacer is formed after the opposed electrode is patterned.

In FIG. 9, the spacer 9 is formed on the opposed substrate 11. Then, a structure, in which the trunk wiring 16 provided on the opposed substrate 11 and the branch wiring 7 are electrically connected to each other via the transparent electrode 10, is formed by depositing and patterning an opposed electrode material.

In FIG. 10, the trunk wiring 6 and the branch wiring 7 which are provided on the TFT side substrate are electrically connected to each other via the transparent electrode 10 formed between two contact holes which penetrate the gate insulating film 13, the protective film 12, and the interlayer insulating film 15.

On the other hand, the spacer 9 is formed on the opposed substrate 11. Then, the opposed electrode material is deposited and patterned. However, in FIG. 10, the opposed electrode material is patterned and removed in the periphery of the spacer, and hence the trunk wiring 16 provided on the opposed substrate is prevented from being connected to the trunk wiring 6 and the branch wiring 7 which are provided on the TFT side substrate.

In FIG. 11, the trunk wiring 6 and the branch wiring 7 which are provided on the TFT side substrate are connected to each other via the transparent electrode 10 formed between two contact holes which penetrate the gate insulating film 13, the protective film 12, and the interlayer insulating film 15.

On the opposed substrate 11, the opposed electrode material is deposited and patterned. Then, the spacer 9 is formed on the opposed substrate 11. For this reason, the trunk wiring 16 provided on the opposed substrate is not connected to the trunk wiring 6 and the branch wiring 7 which are provided on the TFT side substrate. The portion shown in FIG. 11 is a portion which is other than the connection portion shown in FIG. 9 and at which the cell gap needs to be regulated.

Embodiment 2 includes a structure in which, by using the trunk wiring provided on the opposed substrate, a signal is made to pass through the pad section connected to the branch wiring, so as to be input into each circuit. Usually, the layer between the TFT side source electrode and the CF side opposed electrode has a sufficiently large thickness of 3 to 5 μm (corresponding to the cell gap) as compared with the interlayer film thickness GI; 2000 to 6000 Å between the gate and the source. Therefore, in the above-described structure, it is possible to almost neglect the influence of the capacitance (cross capacitance) formed at the crossing portion between the branch wiring connecting the trunk wiring to each of the circuit drive transistors, and the trunk wiring arranged on the side closer to the display area than the trunk wiring connected to the branch wiring (which side may also be referred to as the side in the branch wiring drawing direction). Therefore, in the usual circuit design, the picture-frame size is inevitably increased, but in the present invention, the influence of the cross capacitance between the trunk wiring and the branch wiring can be reduced, and hence it is possible to carry out a design with a suitable margin.

Note that the cross capacitance causes the deterioration of the waveform due to the up and/or down transitions in the output waveform of the gate. For this reason, the size of the transistors is designed with a sufficient margin in the usual circuit design. Thereby, the picture-frame size is inevitably increased.

That is, when all or a part of the trunk wiring, which is conventionally formed on the side of the TFT side substrate, is formed as the trunk wiring which is provided on the opposed substrate by using the opposed electrode material, the cross capacitance can be reduced, and hence the picture-frame size can be reduced. Further, all or a part of the trunk wiring on the side closest to the display area is provided on the opposed substrate. Thereby, in addition to the effect of reducing the cross capacitance, the number of the trunk wirings on the TFT side can be reduced, so that the effect of reducing the picture-frame size is also obtained.

FIG. 12 is a schematic plan diagram showing a configuration of signal wirings in the gate driver section of a modification of Embodiment 2.

In FIG. 12, the trunk wiring denoted by reference numeral (1) is provided on the outermost side (picture-frame side), and the trunk wiring denoted by reference numeral (4) is provided on the innermost side (display area side).

In FIG. 12, the trunk wiring denoted by reference numeral (2) and shown by the broken line, and its branch wiring also shown by the broken line are provided on the opposed substrate. The trunk wiring denoted by reference numeral (2) intersects with the branch wiring extended from the trunk wiring (trunk wiring denoted by reference numeral (1) in FIG. 12) arranged on the side closer to the picture-frame end side than the trunk wiring denoted by reference numeral (2), and hence the capacitance (which may also be referred to as cross capacitance) can be reduced at the crossing portion (the cross capacitance between the trunk wiring itself and the other branch wiring at the portion surrounded by the dotted line can be reduced) as compared with the case where the trunk wiring denoted by reference numeral (2) is provided on the circuit substrate.

Further, the branch wiring, which is extended from the trunk wiring denoted by reference numeral (2) (similarly in the case of the trunk wiring denoted by reference numeral (3)) and is provided on the opposed substrate, intersects with the trunk wirings provided on the inner side of the trunk wiring denoted by reference numeral (2) (intersects with the trunk wiring denoted by reference numeral (3) and the trunk wiring denoted by reference numeral (4)), and hence the cross capacitance at the crossing portion (the cross capacitance between the branch wiring itself and the other trunk wiring at the portion surrounded by the solid line) can be reduced as compared with the case where the branch wiring is provided on the circuit substrate.

In the case of this modification, contact pad sections, in which the wiring provided on the opposed substrate and the wiring provided on the circuit substrate are connected to each other via a transparent electrode 10d, are provided on the inner side of the trunk wiring denoted by reference numeral (4). Therefore, the effect of reducing the picture-frame area based on the reduction in the number of trunk wirings on the side of the circuit substrate is not particularly obtained.

Further, examples of another modification of Embodiment 2 include a configuration in which, instead of providing, on the opposed substrate, the trunk wiring denoted by reference numeral (2) and its branch wiring in the FIG. 12, the trunk wiring denoted by reference numeral (1) and its branch wiring are provided on the opposed substrate. In this case, the effect of reducing the cross capacitance between the branch wiring itself and the other trunk wiring is obtained. In other words, even in the case where the trunk wiring denoted by reference numeral (2) and its branch wiring are not provided on the opposed substrate, when the trunk wiring denoted by reference numeral (1) and its branch wiring are provided on the opposed substrate, the cross capacitance between the trunk wiring denoted by reference numeral (2) and the branch wiring extending from the trunk wiring denoted by reference numeral (1) can be reduced. Further, a configuration, in which the redundant structure in Embodiment 1 is applied to the trunk wiring, may also be adopted.

Note that, in Embodiments 1 and 2, it is presupposed that an alignment film (polyimide material) is not applied to the circuit section, but a PI material may be used. In this case, Embodiments 1 and 2 can be realized by patterning only the connection portions with the opposed substrate side.

Examples of the modification of Embodiment 2 may include a configuration in which a non-conductive spacer, such as a plastic bead (PB), is used in the portion where the cell gap needs to be regulated, other than in the connection section between the trunk wiring 6 and the branch wiring 7 that are provided on the TFT substrate of the gate driver section in the schematic cross-sectional view taken along line G'-H' of FIG. 8.

Embodiment 3

FIG. 13 is a schematic plan diagram showing a schematic view of a panel of Embodiment 3.

FIG. 13 shows a configuration in which the pixel electrode area 1 that is the display area is provided under the color filter of the liquid crystal display panel, in which contact location areas 20 are provided at the four corners of the non-display areas, in which gate drive circuit section areas 21 are provided on both longitudinal end sides of the display area, and in which driver tips 22 are further provided in the lower portions in the figure.

FIG. 14 is a view in which a portion (right portion) of the panel of Embodiment 3 is enlarged.

In FIG. 14, the trunk wiring 6 and the branch wiring 7 which are provided on the TFT side substrate are electrically connected to each other via the transparent electrode. The branch wiring 7 is connected to the gate electrode or the source electrode of each transistor of the gate drive circuit section.

In FIG. 14, the area surrounded by the dotted line shows the position 14 of the gate start pulse signal (GSP signal) wiring in the case where the gate start pulse signal wiring is provided on the TFT side substrate. When the gate start pulse signal wiring is provided on the opposed substrate, the circuit section can be reduced by the area corresponding to the portion surrounded by the dotted line, and hence the picture-frame area can be reduced.

The wiring used to input the gate start pulse signal is extended from the input chip of the TFT side substrate to pass through the contact location area 20 and is connected to a first pad section 29 located in one of the four corners of the display panel. The wiring is further extended from the first pad section 29 to pass through the circuit section area 21 of the opposed substrate and is connected to a second pad section 30 located in the contact location area 20. The wiring is further extended from the second pad section 30 to pass through the contact location area 20 of the TFT side substrate and is connected to the first driving circuit 32 of the parallel driving circuits of the shift register circuit.

In the shift register circuit, when the GSP signal is input into the first driving circuit 32 of the parallel driving circuits, a scanning signal (which may also be referred to as a gate signal [Gout]) 33 is output, and a next stage setting signal 34 is input into the next driving circuit. Thereby, the second stage is driven. Similarly, the stages subsequent to the second stage are driven successively.

That is, the signal is input through the path of the TFT side first pad section 29 (input chip output→panel input)→the opposed substrate side signal wiring→the TFT side second pad section 30 (trunk wiring→gate driver GSP input).

The first and second pad sections 29 and 30 for the above-described contacts are provided in the contact location area 20 shown in FIG. 14, and the wiring is made to pass through the circuit section area 21 of the opposed substrate. Thereby, the wiring can be made to pass through the area having no influence on the width of the picture-frame. Therefore, the GSP signal wiring conventionally provided on the TFT side is eliminated, and hence the picture-frame size can be reduced by the amount corresponding to the area occupied by the GSP signal wiring.

Note that the other configuration and the manufacturing method are the same as the configuration and the manufacturing method which are shown in Embodiment 1.

Examples of a modification of Embodiment 3 may include a configuration in which the GSP signal wiring is the clear (CLR) signal wiring. In this configuration, the stage closest to the substrate end on which the input chip is arranged becomes the first stage, and the stage closest to the substrate end side opposite to the substrate end side on which the input chip is arranged becomes the final stage. Similarly to the GSP signal wiring which inputs the signal, as a trigger signal, (inputs the gate start pulse signal) to set the first stage of the shift register circuit, the CLR signal wiring inputs the CLR signal to the final stage of the shift register circuit, and thereby the CLR signal is shifted from the final stage to the first stage in the reverse direction of the above-described successive driving of the shift register circuit. The CLR signal is used to transmit the drive completion signal to the shift register which has been successively driven to its final stage and is used to reset the all circuits of the shift register in preparation for the next driving. Even with the configuration described above, the CLR signal wiring conventionally provided on the TFT side is eliminated, and hence the picture-frame size can be reduced by the amount corresponding to the area occupied by the CLR signal wiring.

FIG. 15 is a partially enlarged view of a panel of a modification of Embodiment 3.

As shown in FIG. 15, examples of another modification of Embodiment 3 may include a configuration in which the CLR signal wiring is provided on the opposed substrate so as to cross the other trunk wiring provided on the circuit substrate, so as to input the signal into the final stage of the shift register circuit. Here, the CLR signal wiring is arranged in the path of the TFT side first pad section 29 (input chip output→panel input)→an opposed substrate side signal wiring 38→a TFT side third pad section 39 (trunk wiring→CLR input) so as to input the signal into the driving circuit 35 provided as the final stage of the shift register circuit. In this way, the first pad section 29 and the third pad section 39 are electrically connected to each other via the opposed substrate side signal wiring 38. Further, the opposed substrate side signal wiring 38 intersects with the other trunk wiring provided on the circuit substrate. This configuration has an advantage that the picture-frame area is reduced and the design flexibility of the layout is improved.

Note that, for example, the GSP signal wiring may also be used instead of the CLR signal wiring. In this configuration, the stage closest to the substrate end side on which the chip input is arranged becomes the first stage, while the stage closest to the substrate end side opposite to the substrate end side on which the chip input is arranged becomes the final stage.

The liquid crystal display panel described in Embodiments 1 to 3 described above usually includes a polarizing plate on the back surface side of the TFT side substrate and also on the front surface side of the opposed substrate facing the TFT side substrate. Further, the liquid crystal display panel includes, as required, a backlight on the back surface side of the polarizing plate provided on the back surface side of the TFT side substrate. The light of the backlight passes through the polarizing plate, the TFT side substrate, the liquid crystal layer, the opposed substrate, and the polarizing plate in this order, and the transmission and non-transmission of light are controlled by the orientation control of the liquid crystal.

The present embodiment is also a liquid crystal display apparatus provided with the liquid crystal display panel described in Embodiments described above. The liquid crystal display apparatus of the present embodiment can be formed in various conventionally known configurations as long as the liquid crystal display apparatus includes the liquid crystal display panel of the present embodiment. For example, a configuration may be adopted which is closed by a front cabinet and a back cabinet, and in which the back cabinet is fixed to a stand.

The above-described embodiments are described in relation to a liquid crystal display panel and a liquid crystal display apparatus, but the present invention is not limited to these. The same operation effects can be obtained also in EL display apparatuses, such as an organic electroluminescence display apparatus and an inorganic EL display apparatus.

The aforementioned modes of the embodiments may be employed in appropriate combination as long as the combination is not beyond the spirit of the present invention.

The present application claims priority to Patent Application No. 2009-246960 filed in Japan on Oct. 27, 2009 under the Paris Convention and provisions of national law in a designated State, the entire contents of which are hereby incorporated by reference.

EXPLANATION OF NUMERALS AND SYMBOLS

1: Pixel electrode area
2: Picture-frame area
3: Black matrix
4: Gate drive circuit section transistor group
5: Contact hole
6, 6b, 6c: Trunk wiring provided on TFT side substrate
7, 7a, 7b, 7c: Branch wiring
8: Area in which opposed substrate side trunk wiring is formed
9: Spacer
10, 10a, 10b, 10c, 10d: Transparent electrode
11: Opposed substrate
12: Protective film
13: Gate insulating film
14: Position of gate start pulse signal wiring when gate start pulse signal wiring is provided on TFT side substrate
15: Interlayer insulating film
16: Trunk wiring provided on opposed substrate
17: Wiring mutually connecting transistors
18: Driving circuit section transistor
19: TFT side substrate
20: Contact location area
21: Circuit section area
22: Driver chip
23: Area under color filter
24: Signal wiring n+1
25: Signal wiring n
26: Signal wiring n−1
27: Active area
28: Wiring from input chip to first pad section
29: First pad section
30: Second pad section 31: GSP signal input
32: First driving circuit of parallel driving circuits
33: Scanning signal output
34: Next stage set signal input
35: Driving circuit
36: Substrate end (picture-frame end)
37, 37a: Panel opposed substrate end
38: Opposed substrate side signal wiring
39: Third pad section
40: CLR signal input
41: Reset input
100: Liquid crystal display device

The invention claimed is:

1. A display panel including a circuit substrate and an opposed substrate facing the circuit substrate, wherein
    the display panel includes a circuit section arranged in a picture-frame area of the display panel,
    the circuit section includes a trunk wiring, and a branch wiring connected to a gate electrode or a source electrode of a transistor in the circuit section,
    all or a part of the trunk wiring is provided on the opposed substrate,
    the branch wiring is provided on the circuit substrate and is electrically connected to the trunk wiring via a conductor, and
    a part of the trunk wiring is arranged on a spacer formed on the opposed substrate, and the trunk wiring arranged on the spacer is connected to the conductor.

2. The display panel according to claim 1, wherein
    the trunk wiring includes a redundant structure in which a wiring section provided on the circuit substrate and a wiring section provided on the opposed substrate are connected in parallel with each other.

3. The display panel according to claim 1, wherein
    all or a part of the transistors are amorphous silicon thin film transistors.

4. The display panel according to claim 1, wherein
    the circuit section includes a gate driver.

5. The display panel according to claim 1, wherein
    all or a part of the trunk wiring provided on the opposed substrate is formed of an opposed electrode material.

6. The display panel according to claim 1, wherein
    all or a part of the trunk wiring provided on the opposed substrate is formed of a metallic black matrix material.

7. A display apparatus comprising the display panel according to claim 1.

* * * * *